United States Patent [19]

Meier

[11] 3,723,821
[45] Mar. 27, 1973

[54] QUENCH-GAP ASSEMBLY FOR LIGHTNING ARRESTERS

[75] Inventor: Eugen Meier, Wettingen, Switzerland

[73] Assignee: Aktiengesellschaft Brown, Boveri & Cie, Baden, Switzerland

[22] Filed: May 19, 1972

[21] Appl. No.: 254,962

[30] Foreign Application Priority Data

June 7, 1971 Switzerland..........................8304/71

[52] U.S. Cl. ........................317/69, 317/74, 317/77
[51] Int. Cl. ................................................H02h 9/06
[58] Field of Search................317/74, 78, 61, 69, 77

[56] References Cited

UNITED STATES PATENTS

| | | | |
|---|---|---|---|
| 3,611,045 | 10/1971 | Sakshaug.............................317/74 |
| 3,670,204 | 6/1972 | Greuter..............................317/74 X |
| 3,686,532 | 8/1972 | Rudolph et al.........................317/70 |

Primary Examiner—James D. Trammell
Attorney—Pierce, Scheffler, Parker

[57] ABSTRACT

A quench-gap assembly of a lightning arrester includes a cylindrical spark-over chamber and a pair of cylindrical spark blow-out chambers located respectively to each side of the spark-over chamber and connected thereto by slits. A central electrode extends into the three chambers and each spark blow-out chamber is provided with a concentric ring electrode connected respectively to one of the members in the spark-over chamber between which the arc is initially struck. The arc expanding under the action of the force produced by a magnetic field reaches the central electrode in the form of two partial arcs each which is then directed through one of the slits into the corresponding spark blow-out chamber and there further given a combined rotational and expanding movement with one root of the arc terminating on the central electrode and the other root on the ring electrode.

4 Claims, 4 Drawing Figures

1

QUENCH-GAP ASSEMBLY FOR LIGHTNING ARRESTERS

The present invention relates to an improvement in a quench-gap assembly for lightning arresters provided with means for magnetically influencing the arc.

Lightning arresters have long been known in which the arc produced during the discharge process is blown by a magnetic field in order to lengthen it. A further method is known whereby in arc-quenching devices for electric switches, the arc caused on interruption is broken down into a number of partial arcs, the roots of which are set in rotation by means of a magnetic blow-out field (German Pat. No. 1 031 866). The arc roots, in this case, run round on the outer surface of two ring-shaped parts between which there is an insulating partition of such configuration that the length of each partial arc is varied during the rotary movement. The method of dividing the arc in the radial direction by means of metal elements is also known for such switches (German Pat. No. 1 055 081). Also, a device is known for interrupting high powers in d.c. or a.c. circuits, in which the arc rotates in a magnetic field while its roots remain fixed, one root being attached to an electrode in the center of a disc-shaped magnet arrangement, while the other root is attached to an electrode outside the magnet arrangement (German Pat. 1 226 680). Finally, an overvoltage protection device for series capacitor banks is known in which disc-shaped electrodes with interposing ignition points are provided to initiate striking of the arc (German Pat. No. 1 154 189). After ignition, the arc is then forced by a magnetic field to move along the disc-electrode surfaces in a closed path, an insulating screen near the ignition point ensuring that the arc is deflected to a path which does not touch the ignition point.

The known arrangements are, however, not necessarily suitable for use with lightning arresters of high discharge capacity with at the same time high and very high service voltages.

The primary object of this invention is to provide an improved quench-gap assembly for lightning arresters of high discharge capacity and for very high service voltages such that not only is the arc efficiently cooled but also the maximum arc voltage is obtained, resulting in a good protective effect and wider possible application of the arrester.

This objective is achieved in that at each side of a sparkover chamber there is a spark blow-out chamber into both of which an arc occurring in the sparkover chamber is blown by way of slits leading from the sparkover chamber to the spark blow-out chambers, such that in the blow-out chambers the partial arcs divided by means of a central electrode passing through the chambers can be made to rotate by magnetic means between the central electrode and a ring electrode present in each of the blow-out chambers.

A preferred embodiment of the invention is shown in the accompanying drawings, in which.

Figure 1:
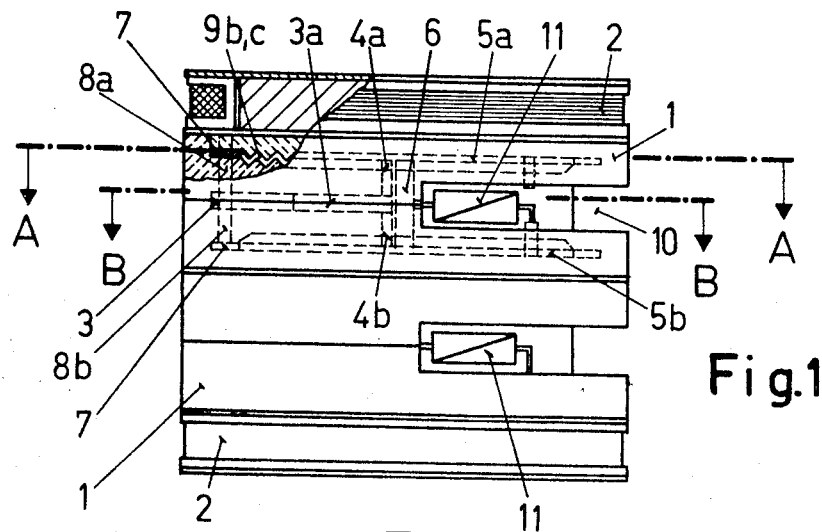
FIG. 1 shows in partly sectional elevation a section of the active part of a cylindrical lightning arrester with two stacked quench-gap assemblies according to the invention.
Figure 2:
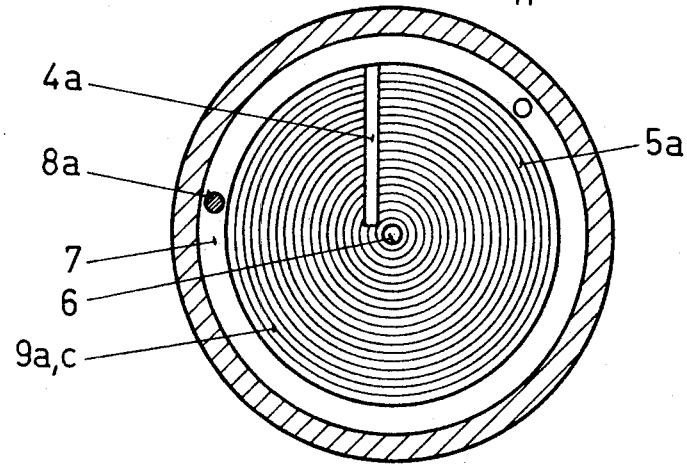
FIG. 2 is a plan section taken at line A—A in FIG. 1 and in the direction of the arrows.
Figure 3:
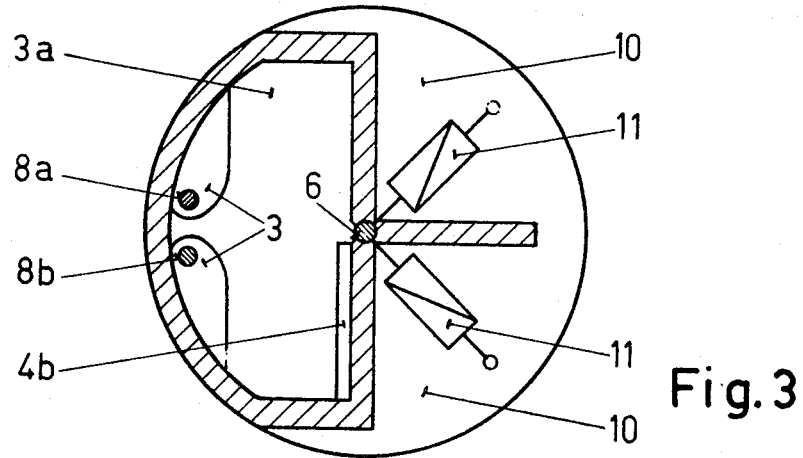
FIG. 3 is a section taken at line B—B in FIG. 1 and in the direction of the arrows; and, FIG. 4 is a schematic representation of the quench-gap assembly.
Figure 4:
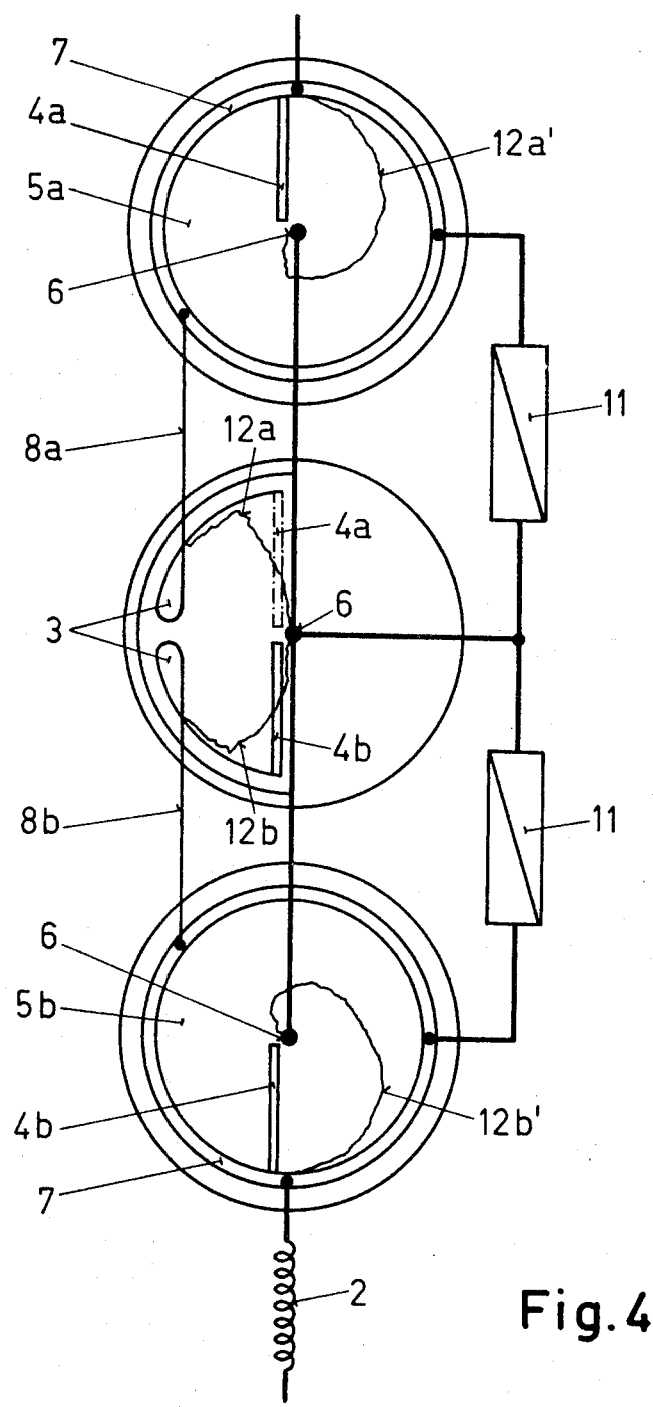

In FIG. 1 the whole cylindrical quench-gap assembly 1 is shown duplicated, i.e., there are two identical superposed assemblies. Both above and below the two assemblies there is a coil 2 producing a magnetic field for magnetically influencing the arc. A sparkover gap 3 in sparkover chamber 3a formed by arcing horns is located in the middle of each quench-gap assembly 1. From sparkover chamber 3a, a slit 4a leads to the upper spark blow-out chamber 5a and another such slit 4b leads to the lower spark blow-out chamber 5b. Chambers 5a and 5b contain ring electrodes 7, each of which is electrically connected to an electrode of sparkover gap 3 by means of studs 8a and 8b, respectively. A ring-shaped auxiliary electrode can be fitted in known manner between central electrode 6 and ring electrode 7 to divide the arc. The electrical connections between the various parts are most clearly evident from FIG. 4, in which the same reference symbols are used for corresponding parts. The boundary walls 9a and 9b of blow-out chambers 5a and 5b have concentrically arranged interfitting projections and depressions 9c such that each projection is located opposite a depression to establish a zig-zag longer path for the arc. The spark blow-out assembly 1 has recesses 10 to accommodate, in a space-saving manner, the control impedances 11 which, as shown in FIG. 4, are connected between the central electrode 6 and ring electrode 7 and serve to distribute the voltage in the known manner.

When an overvoltage occurs, there appears at sparkover gap 3 an arc which passes into sparkover chamber 3a under the driving influence of the magnetic field of blow-out coil 2. Its middle portion reaches central electrode 6, whereupon two partial arcs 12a and 12b (FIG. 4) are formed. Partial arcs 12a and 12b are blown through slits 4a and 4b, respectively, into upper blow-out chamber 5a and lower blow-out chamber 5b (12a' KLB') and then become attached to ring electrode 7, whereupon, as a result of the magnetic field of blow-out coil 2, one root of each partial arc runs rapidly round the ring electrode, while the other root of each partial arc remains on central electrode 6. In this manner, the partial arcs (12a' 12b') undergo intensive cooling, and in consequence the arc voltage is maintained practically constant and high. As soon as the partial arcs have passed into the blow-out chambers 5a and 5b, the arc at sparkover gap 3 is quenched because this gap is then shunted by the arcs (12a', 12b') in the blow-out chambers 5a and 5b. The sparkover chamber 3a thus contains no arc and so the sparkover gap 3 regains its full dielectric strength.

With this new arrangement it is possible to build lightning arresters of high discharge capacity for up to the highest service voltages. For this, a number of the improved quench-gap assemblies can be connected in series and also, if necessary, a number of blow-out coils can be provided.

I claim:

1. In a cylindrical quench-gap assembly component of a lightning arrester, the combination comprising a cylindrical spark-over chamber containing a pair of spaced arcing members between which an arc gap is formed, a cylindrical spark blow-out chamber located to each side of said spark-over chamber, an electrode located centrally within said spark-over chamber and extending into each of said spark blow-out chambers, a ring electrode located at the boundary wall of each of said spark blow-out chambers, means electrically connecting each of said ring electrodes with a corresponding one of said arcing members forming said arc gap, means providing slits extending respectively from said spark-over chamber into each of said spark blow-out chambers, and coil means surrounding said quench-gap assembly for producing a magnetic field which serves to expand and divide the arc drawn initially between said arcing members into two partial arcs each of which reaches said central electrode, said partial arcs being forced respectively through said slits into said spark blow-out chambers and each said partial arc then undergoing a rotational and expanding movement between the ring and central electrodes.

2. A quench-gap assembly of a lightning arrester as defined in claim 1 and which further includes a ring-shaped auxiliary electrode in each of said spark blow-out chambers between said central and ring electrodes.

3. A quench-gap assembly of a lightning arrester as defined in claim 1 and wherein the configuration of said spark-over chamber and said spark blow-out chambers is such as to establish a recess within which is located control impedances connected respectively between said central electrode and said ring electrodes.

4. A quench-gap assembly of a lightning arrester as defined in claim 1 wherein the upper and lower boundary walls of said spark blow-out chambers are provided with concentrically arranged and interfitting projections and depressions which establish a zig-zag elongation of the path which each of said partial arcs is required to travel.

* * * * *